United States Patent
Tseng et al.

(10) Patent No.: US 7,720,183 B2
(45) Date of Patent: May 18, 2010

(54) APPARATUS AND METHOD FOR INTER-CARRIER INTERFERENCE SELF-CANCELLATION AND INTER-CARRIER INTERFERENCE RECONSTRUCTION AND CANCELLATION

(75) Inventors: Ming-Chien Tseng, Taipei (TW);
Chorng-Ren Sheu, Kaohsiung (TW);
Ching-Yung Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 741 days.

(21) Appl. No.: 11/646,771

(22) Filed: Dec. 28, 2006

(65) Prior Publication Data

US 2008/0159420 A1    Jul. 3, 2008

(51) Int. Cl.
*H03D 1/04*    (2006.01)
(52) U.S. Cl. .................. 375/346; 375/260; 375/229; 375/341
(58) Field of Classification Search .......... 375/260, 375/148, 348, 229, 346, 341; 370/201
See application file for complete search history.

(56) References Cited

U.S. PATENT DOCUMENTS

2005/0265467 A1* 12/2005 Dabak et al. ............... 375/260
2006/0239367 A1* 10/2006 Wilhelmsson et al. ....... 375/260
2007/0248151 A1* 10/2007 Kim et al. .................. 375/148
2008/0112518 A1* 5/2008 Wilhelmsson ............... 375/348
2009/0059781 A1* 3/2009 Tseng et al. ................ 370/201

FOREIGN PATENT DOCUMENTS

CN    1617531 A    5/2005

OTHER PUBLICATIONS

Sheu et al. "A Novel Guard Interval Based ISI-Free Sampling Region Detection Method for OFDM Systems"; IEEE 2004; pp. 515-519.*
Chang; "A Novel Algorithm of Inter-Subchannel Interference Self-Cancellation for OFDM Systems"; IEEE 2007; pp. 2881-2893.*

(Continued)

*Primary Examiner*—Sudhanshu C Pathak
(74) *Attorney, Agent, or Firm*—Alston & Bird LLP (57) ABSTRACT

A method for ICI self-cancellation and ICI reconstruction and cancellation is introduced. The method includes receiving input signals; receiving boundary information regarding a length q of an ISI-free region of the received signals; selecting a plurality of ISI-free signals from the received signals; combining the plurality of ISI-free signals to provide combined signals $z(n)$; performing FFT operations on the combined signals to provide output signals $Z(k)$; reconstructing ICI based on the output signals $Z(k)$ and the length q of the ISI-free region of the input signals $r(n)$ in order to provide an estimated ICI; subtracting the estimated ICI from the output signals $Z(k)$ to provide a cancelled signal $W(k)$; performing a channel estimation for the cancelled signal $W(k)$; equalizing the cancelled signal $W(k)$ to provide an equalized signal; and de-mapping the equalized signal to provide a de-mapped signal $d(k)$.

22 Claims, 6 Drawing Sheets

OTHER PUBLICATIONS

Beaulieu et al. "Receiver Windowing for Reduction of ICI in OFDM Systems with Carrier Frequency Offset"; IEEE Globecom 2005; pp. 2680-2684.*

Yoshida et al.; "Laboratory Experiment of OFDM Transmission Using VLP and pre-FFT Equalizer over ISI Channels"; IEEE 2004; pp. 540-544.*

Claus Muschallik; "Improving an OFDM Reception Using an Adpative Nyquist Windowing"; IEEE 1996; pp. 259-269; Jun. 1996; Corporate Research & Advanced Development, Villingen, Germany.

Ming-Xian Chang; "A Novel Algorithm of Inter-Subchannel Interference Cancellation in OFDM Systems"; IEEE 2004; pp. 460-464; Jul. 2004, Department of Electrical Engineering, National Cheng-Kung University, Tainan 70101, Taiwan.

* cited by examiner

APPARATUS AND METHOD FOR INTER-CARRIER INTERFERENCE SELF-CANCELLATION AND INTER-CARRIER INTERFERENCE RECONSTRUCTION AND CANCELLATION

BACKGROUND OF THE INVENTION

The invention relates to the transmission of orthogonal frequency division multiplexing (OFDM) signals, and specifically, relates to a method and an apparatus for inter-carrier interference (ICI) self-cancellation and ICI cancellation and reconstruction of OFDM signals.

In wireless communication systems, signals may be transmitted in electromagnetic waves through a physical channel such as air. Due to undesirable channel effects such as, for example, multi-path reflection and multi-path fading, signals may generally be distorted when received. An orthogonal frequency division multiplexing (OFDM) system based on multi-carrier modulation has been developed to address the issue of multi-path reflection. With only one simple one-tap equalizer at the receiver, the OFDM system is able to equalize signals that may have suffered from constructive interference or destructive interference caused by the multi-path effects. Therefore, the OFDM scheme becomes a mainstream scheme in the wired/wireless communications and in the digital terrestrial broadcasting applications. Examples of the OFDM applications may include Asymmetric Digital Subscriber Line (ADSL), Power Line Communication (PLC), and Digital Audio Broadcasting (DAB) systems, and may further include Wireless Local Area Network (IEEE 802.11a/b/g/n), Wi-MAX (IEEE 802.16 series), and Digital Video Broadcasting (DVB) over terrestrial (DVB-T) and over handheld devices (DVB-H) under research and development.

To prevent an OFDM system from the multi-path channel effect, a duplicate of a section of an original useful symbol, called a guard interval (GI), having a length $T_g$, is cyclically prefixed to the original useful symbol, which has a length $T_u$ with N sampling points, to form a complete OFDM symbol before OFDM signals are transmitted into the channel. When the maximum channel delay, $\tau_{max}$, is shorter than the length of GI, $\tau_g$, the inter-symbol-interference (ISI) caused by the multi-path channel may be prevented in the OFDM receiver. The receiver then discards the GI sections and retrieves the useful symbols from the received symbols, and compensates for the channel effect by an one-tap equalizer so as to estimate the transmitted data.

In the specifications of some OFDM systems, such as the DVB-H and IEEE 802.16, it is emphasized that receivers have to provide desirable capability of reception when moving at a high speed. However, when a receiver of an OFDM system is not stationary and may be mobile relative to a transmitter at a relatively high speed, the status of the channel within a useful symbol duration may be no more constant. The channel may thus become a time-selective fading channel, which may result in one time of Doppler frequency offset, either positive or negative, in carriers relative to a center carrier frequency, $f_c$. Such a frequency offset is unfavorable to a multi-carrier modulation system such as the OFDM system, and may incur inter-carrier interference (ICI) that destroys the orthogonality of the system, disadvantageously resulting in an "error floor" effect in the bit error rate (BER).

It may be desirable to have an apparatus and a method to address the ICI issue due to the Doppler effect in an OFDM system.

BRIEF SUMMARY OF THE INVENTION

Examples of the present invention may provide inter-carrier interference reconstruction and cancellation devices and related methods that utilize the information of the length of ISI-free region of the OFDM signals.

One example of the present invention may provide an inter-carrier interference (ICI) reconstruction device for providing an estimated ICI. The ICI reconstruction device includes a channel estimator capable of providing an averaged channel response for received signals during one OFDM symbol, a delay unit capable of delaying the averaged channel response to provide a delayed averaged channel response, a subtracting unit capable of subtracting the delayed averaged channel response from the averaged channel response to provide a channel variance term during one OFDM symbol, a first cyclic shifter capable of cyclically shifting the channel variance term to provide a cyclic shifted channel variance term, a one-tap equalizer capable of equalizing the received signals to provide an equalized signal, a symbol de-mapping unit capable of de-mapping the equalized signal to provide a de-mapped signal, a symbol mapping unit capable of providing a mapped symbol based on the de-mapped signal, a second cyclic shifter capable of cyclically shifting the mapped symbol to provide a cyclic shifted mapped symbol, a multiplier capable of providing an ICI term by multiplying the cyclic shifted channel variance term and the cyclic shifted symbol with an ICI attenuation coefficient due to signals received from a surrounding i-th sub-carrier, i being an integer, wherein the ICI attenuation coefficient is related with a length of ISI-free region, and a summing unit capable of summing ICI terms provided by the multiplier to provide an estimated ICI, wherein each of the ICI terms corresponds to a different value of i.

Another example of the present invention may provide a device for ICI self-cancellation and ICI reconstruction and cancellation. The device for ICI self-cancellation and ICI reconstruction and cancellation includes a selecting device capable of selecting a plurality of ISI-free signals from input signals and receiving boundary information regarding a length q of an ISI-free region, a combiner capable of combining the plurality of ISI-free signals to provide combined signals, a Fast-Fourier Transform (FFT) module capable of performing FFT operations on the combined signals to provide output signals, an ICI reconstruction module, a second subtracting unit capable of providing a cancelled signal by subtracting the estimated ICI from the output signals provided by the FFT module, and an equalization module capable of equalizing the signal to provide a de-mapped signal. The combiner further includes a cyclic shifter capable of cyclically shifting a plurality of ISI-free signals to provide a plurality of cyclic shifted ISI-free signals, an averaging unit capable of averaging all the cyclic shifted ISI-free signals to provide the time domain combined signals. The ICI reconstruction module further includes a channel estimator capable of providing an averaged channel response for the output signals during one OFDM symbol, a delay unit capable of delaying the averaged channel response to provide a delayed averaged channel response, a first subtracting unit capable of subtracting the delayed averaged channel response from the averaged channel response to provide a channel variance term during one OFDM symbol, a first cyclic shifter capable of cyclically shifting the channel variance term to provide a cyclic shifted channel variance term, an one-tap equalizer capable of equalizing the output signals to provide an equalized signal, a symbol de-mapping unit capable of de-mapping the equalized signal to provide a de-mapped signal, a symbol mapping unit capable of providing a mapped symbol based on the de-mapped signal, a second cyclic shifter capable of cyclically shifting the mapped symbol to provide a cyclic shifted mapped symbol, a multiplier capable of providing an ICI term by multiplying the cyclic shifted channel variance term and the cyclic shifted symbol with an ICI attenuation coefficient due to signals received from a surrounding i-th sub-carrier, i being an integer, wherein the ICI attenuation coefficient is related to the length of the ISI-free region of the input signals, and a summing unit capable of summing ICI terms provided by the multiplier to provide an estimated ICI, wherein each of the ICI terms corresponds to a different value of i.

The other example of the present invention may provide a device for ICI self-cancellation and ICI reconstruction and cancellation. The device for ICI self-cancellation and ICI reconstruction and cancellation includes a selecting device capable of selecting a plurality of ISI-free signals from input signals and receiving boundary information regarding a length q of an ISI-free region, a FFT module capable of performing FFT operations on the selected signals to provide output signals, a combiner capable of combining the plurality of ISI-free signals from the output of FFT module to provide combined signals, an ICI reconstruction module, a second subtracting unit capable of providing a signal by subtracting the estimated ICI from the output signals provided by the combiner, and an equalization module capable of equalizing the signal to provide a de-mapped signal.

Still another example of the present invention may provide a method for ICI self-cancellation and ICI reconstruction and cancellation. The method includes receiving input signals, receiving boundary information regarding a length q of an ISI-free region of the input signals, selecting a plurality of ISI-free signals from the input signals, combining the plurality of ISI-free signals to provide combined signals, performing FFT operations on the combined signals to provide output signals, reconstructing ICI based on the output signals and the length of the ISI-free region of the input signals in order to provide an estimated ICI, subtracting the estimated ICI from the output signals to provide a cancelled signal, performing a channel estimation for the cancelled signal, equalizing the cancelled signal to provide an equalized signal, and de-mapping the equalized signal to provide a de-mapped signal.

Yet another example of the present invention may provide a device for ICI self-cancellation and ICI reconstruction and cancellation. The device includes a selecting device capable of selecting a plurality of ISI-free signals from input signals and receiving boundary information regarding a length q of an ISI-free region of the input signals, a combiner capable of combining the plurality of ISI-free signals to provide combined signals, a FFT module capable of performing FFT operations on the combined signals to provide output signals, a multi-stage ICI reconstruction and cancellation module including J stages of ICI reconstruction and cancellation modules, and an equalization module capable of equalizing the signal to provide a de-mapped signal. The ICI reconstruction module of the last stage includes a channel estimator capable of providing an averaged channel response for the output signals $Z_{J-1}(k)$, a delay unit capable of delaying the averaged channel response to provide a delayed averaged channel response, a subtracting unit capable of subtracting the delayed averaged channel response from the averaged channel response to provide a channel variance term during one OFDM symbol, a first cyclic shifter capable of cyclically shifting the channel variance term to provide a cyclic shifted channel variance term, a first one-tap equalizer capable of equalizing the output signals to provide an equalized signal, a first symbol de-mapping unit capable of de-mapping the equalized signal to provide a de-mapped signal, a symbol mapping unit capable of providing a mapped symbol based on the de-mapped signal, a second cyclic shifter capable of cyclically shifting the mapped symbol to provide a cyclic shifted symbol, a multiplier capable of providing an ICI term by multiplying the cyclic shifted channel variance term and the cyclic shifted symbol with an ICI attenuation coefficient due to a signals received from a surrounding i-th sub-carrier, i being an integer, wherein the ICI attenuation coefficient is related to the length of the ISI-free region of the input signals, and a second summing unit capable of summing ICI terms provided by the multiplier to provide an estimated ICI, wherein each of the ICI terms corresponds to a different value of i. The equalization module further includes a second channel estimator capable of providing an average channel response during one OFDM symbol for a cancelled signal W(k), a second one-tap equalizer capable of equalizing the cancelled signal W(k) to provide a equalized signal, a second symbol de-mapping unit capable of de-mapping the equalized signal to provide a de-mapped signal.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

In an OFDM system, when the length of a guard interval (GI), for example, $N_g$ samples, is longer than the maximum channel delay, $\tau_{max}$, there may exist an inter-symbol interference-free (ISI-free) region and ISI-free signals therein. Inter-carrier interference (ICI) cancellation methods and devices according to the examples of the present invention may take advantage of the combination of at least two ISI-free signals. With appropriate cyclic shifting and averaging, the time domain combination of the ISI-free signals may help decrease the complexity of ICI cancellation.

Figure 1:
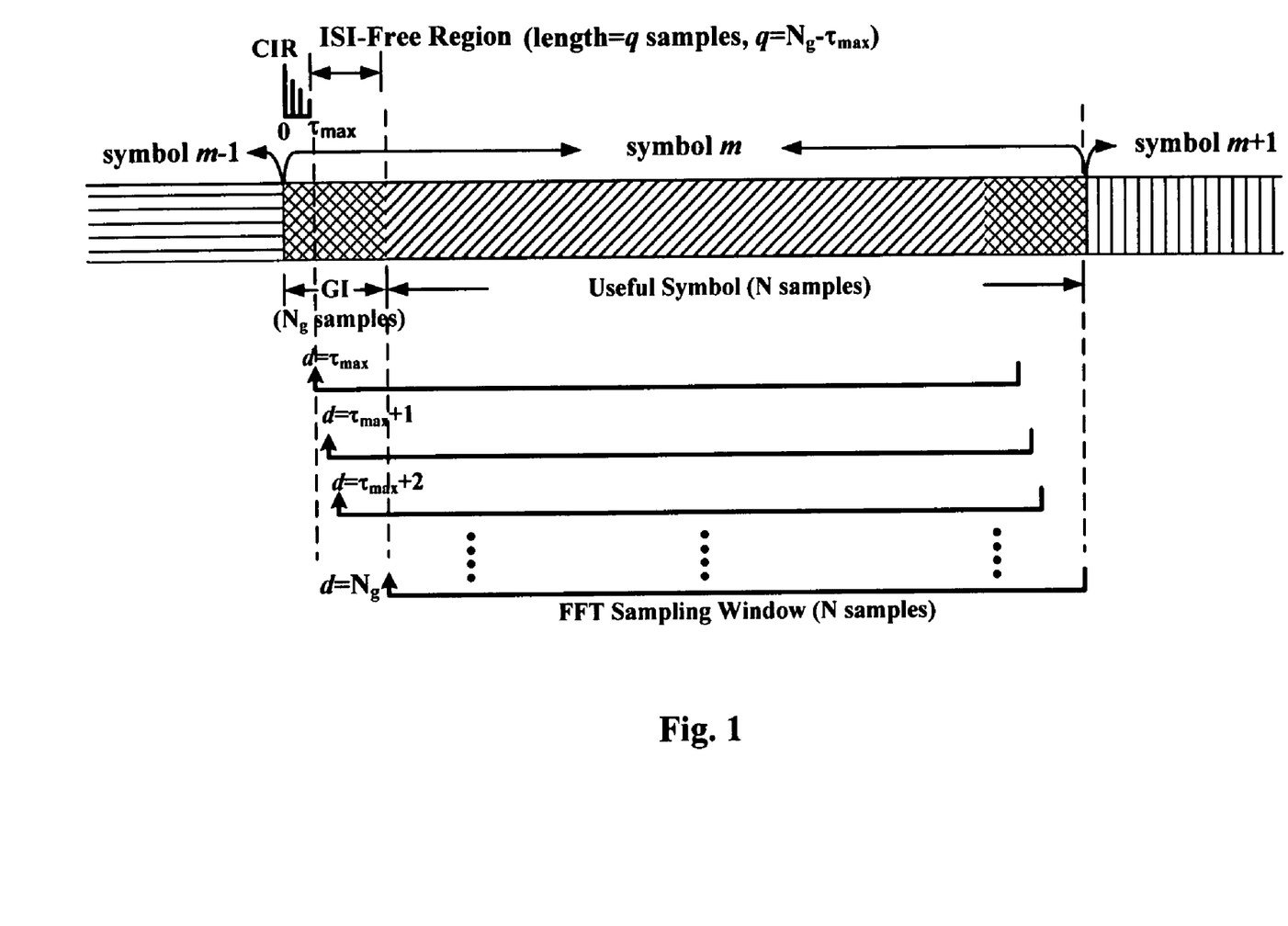
FIG. 1 is a schematic diagram illustrating a method of selecting inter-symbol interference-free (ISI-free) signals according to an example of the present invention.

The examples according to the present invention may require at least two ISI-free symbols in order to perform the ICI self-cancellation. FIG. 1 is a schematic diagram illustrating a method of selecting ISI-free symbols from received signals according to an example of the present invention. When the length of the guard interval (GI), $N_g$ samples, is longer than the maximum channel delay, $\tau_{max}$, there exist an ISI-free region and a couple of ISI-free signals therein for selection. Referring to FIG. 1, the ISI-free region has a length of q samples, wherein q equals $N_g - \tau_{max}$. Furthermore, a number of q ISI-free signals are available for selection because each of the ISI-free signals includes a length of N samples starting from a sample point in the ISI-free region, N being an integer. Specifically, in the present example, each of the ISI-free signals represents a useful symbol of N samples, and may start from a first sample point at $d=\tau_{max}$, which is the beginning of the ISI-free region, a second sample point at $d=N_g$, which is the end of the ISI-free region, or any sample point between the first and second sample points.

Figure 2:
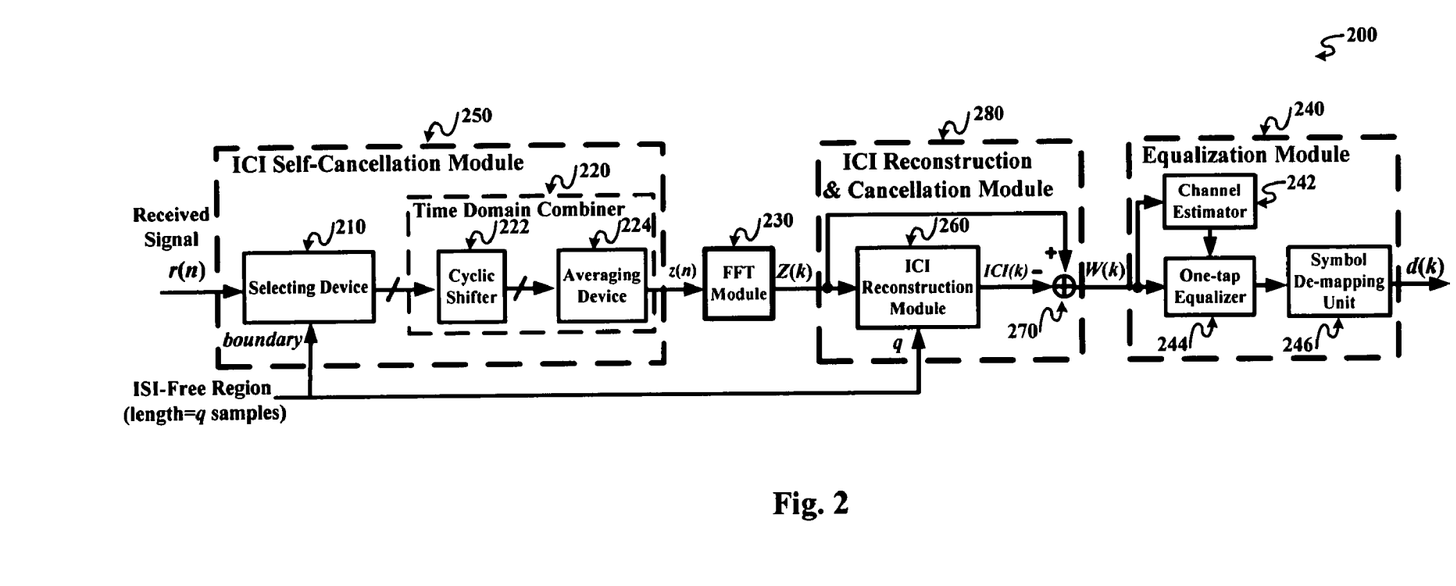
FIG. 2 is a block diagram of an apparatus for inter-carrier interference (ICI) self-cancellation and ICI reconstruction and cancellation according to an example of the present invention.

FIG. 2 is a block diagram of an apparatus 200 for ICI self-cancellation and ICI reconstruction and cancellation according to an example of the present invention. The self-ICI cancellation and ICI reconstruction and cancellation apparatus 200 includes an ICI self-cancellation module 250, a Fast Fourier Transform (FFT) module 230, an ICI reconstruction and cancellation module 280 and an equalization module 240. The ICI self-cancellation module 250 includes a selecting device 210 and a time domain combiner 220. The selecting device 210 is capable of selecting a plurality of ISI-free signals from the received signal r(n) within an ISI-free region. In one example, the selecting device 210 may be designed to select two ISI-free signals from the received signal r(n) within the ISI-free region. The time domain combiner 220, coupled to the selecting device 210, includes a cyclic shifter 222 and an averaging unit 224, and is capable of combining the selected ISI-free signals output from the selecting device 210. The FFT module 230, coupled to the time domain combiner 220, performs an FFT operation on an output signal of the time-domain combiner 220. The equalization module 240, coupled to the FFT module 230, equalizes the output signals Z(k) of the FFT module 230.

The ICI reconstruction and cancellation module 280, coupled to the FFT module 230 and the ISI-free region boundary information, includes an ICI reconstruction module 260 and a subtracting unit 270, and is capable of reconstructing and canceling the ICI terms of the output signal Z(k) of the FFT module 230. The ICI reconstruction module 260, coupled to the FFT module 230, receives the information regarding a length q of an ISI-free region and reconstructs ICI terms from the output signals Z(k) of the FFT module 230.

The subtracting unit 270, coupled to the ICI reconstruction module 260 and the FFT module 230, subtracts the output signal ICI(k) of the ICI reconstruction module 260 from the output signal Z(k) of the FFT module 230. The cancelled signal W(k) provided from the subtracting unit 270 is sent to the channel estimator 242 for estimation of a channel effect, and also sent to the one-tap equalizer 244 for equalization. The de-mapping unit 246, coupled to the one-tap equalizer 244, de-maps signals from the one-tap equalizer 244 to obtain the estimation of de-mapped signal d(k).

In the ICI self-cancellation and ICI reconstruction and cancellation apparatus 200, the selecting device 210 and the time domain combiner 220 may collectively be called an ICI self-cancellation module 250, which may automatically alleviate the error floor effect. However, when the length of the ISI-free region is not greater than half of the useful symbol length N, i.e., $q \leq N/2$, or when there is a significant ICI effect, the ICI reconstruction and cancellation module 280 may then play an important role, as will be described below.

Assuming a time-varying channel in a high-speed moving environment is a linear channel during one OFDM symbol, the output signal Z(k) of the FFT module 230 can be simplified and represented by:

$$Z(k) = \underbrace{X(k)\overline{H}(k)}_{Desired\ Signal} + \underbrace{\sum_{i \neq 0\ and\ i = \pm 1, \pm 2, \ldots} \{X(k+i) \cdot [\Gamma(i)\Delta H(k+i)]\}}_{ICI\ Terms} \quad (1)$$

wherein $\overline{H}(k)$ represents an average channel response, $\Delta H(k)$ represents a channel variation term during one OFDM symbol, and $\Gamma(i)$ represents an attenuation coefficient of the ICI terms caused by signals received from a surrounding i-th sub-carrier. The three variables are expressed in the equations below.

$$\overline{H}(k) = \sum_{i=1}^{L} \left[ c_1^{(l)} \frac{N-1}{2} + c_0^{(l)} \right] e^{-j\frac{2\pi k \tau^{(l)}}{N}}; \quad (2)$$

$$, \Delta H(k) = \sum_{i=1}^{L} [c_1^{(l)} N] e^{-j\frac{2\pi k \tau^{(l)}}{N}}; \quad (3)$$

$$and\ \Gamma(i) = \beta(i) \cdot \frac{1}{2} \left[ 1 + e^{-j\frac{2\pi q i}{N}} \right] \quad (4)$$

$$where\ \beta(i) = \frac{-1}{N} \frac{1}{1 - e^{j\frac{2\pi i}{N}}} \approx \frac{1}{j2\pi i}\ for\ small\ i.$$

$c_0^{(l)}$ represents a start point of channel response during an OFDM symbol and $c_1^{(l)}$ is a slope of channel response during one OFDM symbol for path l.

The attenuation coefficient $\Gamma(i)$ is related to the length of the ISI-free region and can be predetermined. Please note that the equation (4) is only exemplary and not restrictive to the present invention.

Figure 3:
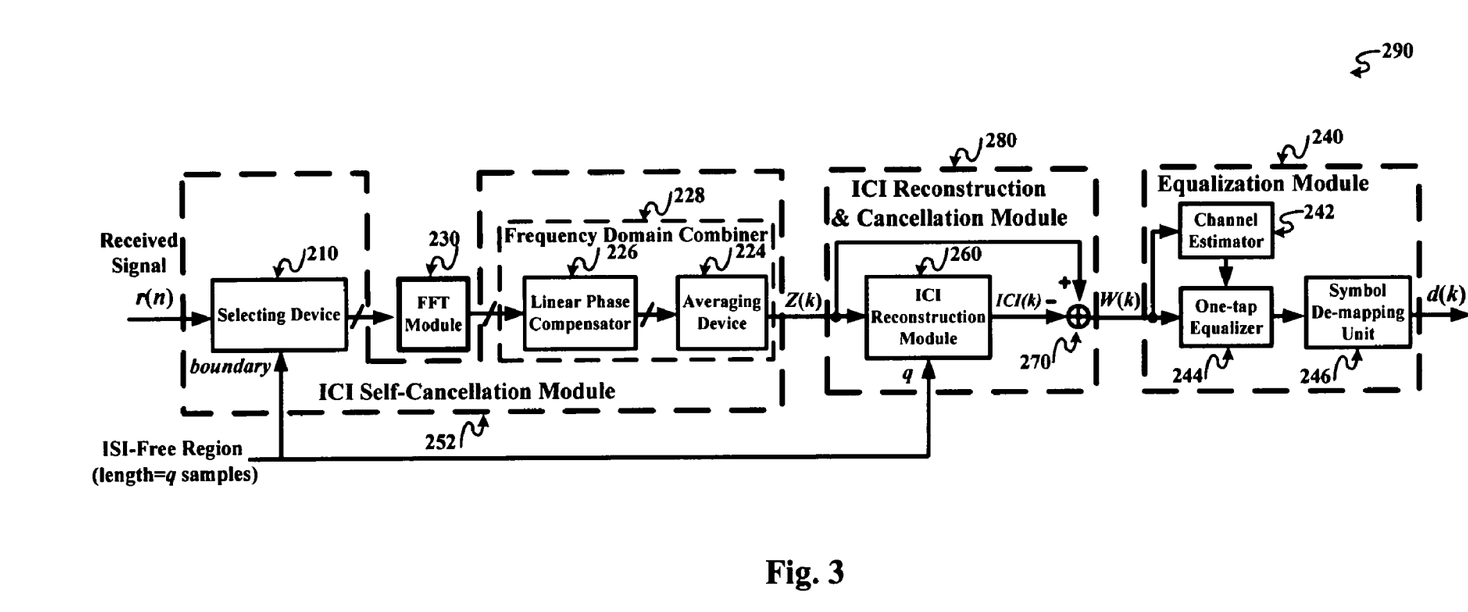
FIG. 3 is a block diagram of an apparatus for ICI self-cancellation and ICI reconstruction and cancellation according to an example of the present invention.

FIG. 3 is a block diagram of an apparatus 290 for ICI self-cancellation and ICI reconstruction and cancellation according to an example of the present invention. The ICI self-cancellation and ICI reconstruction and cancellation apparatus 290 includes an ICI self-cancellation module 252, a Fast Fourier Transform (FFT) module 230, an ICI reconstruction and cancellation module 280 and an equalization module 240. The ICI self-cancellation module 252 includes a selecting device 210 and a frequency domain combiner 228.

The selecting device 210 is capable of selecting a plurality of ISI-free signals from the received signal r(n) within an ISI-free region. In one example, the selecting device 210 may select two ISI-free signals from the received signal r(n) within the ISI-free region. The FFT module 230, coupled to the selecting device 210, performs an FFT operation on an output signal of the selecting device 210. The frequency domain combiner 228, coupled to the FFT module 230, includes a linear phase compensator 226 and an averaging unit 224, and is capable of combining the signals output from the FFT module 230.

The ICI reconstruction and cancellation module 280, coupled to the averaging unit 224 of the frequency domain combiner 228, includes an ICI reconstruction module 260 and a subtracting unit 270, and is capable of reconstructing and canceling the ICI terms of the output signal Z(k) according to the boundary information of the ISI-free region. The ICI reconstruction module 260, coupled to the averaging unit 224 of the frequency domain combiner 228, receives the information regarding a length q of the ISI-free region and reconstructs ICI terms from the output signals Z(k). The subtracting unit 270, coupled to the ICI reconstruction module 260 and the averaging unit 224 of the frequency domain combiner 228, subtracts the output signal ICI(k) of the ICI reconstruction module 260 from the output signal Z(k) of the averaging unit 224 of the frequency domain combiner 228. The equalization module 240 may further include a channel estimator 242, a one-tap equalizer 244, and a symbol de-mapping unit 246. The cancelled signal W(k) provided from the subtracting unit 270 is sent to the channel estimator 242 for estimation of a channel effect, and also sent to the one-tap equalizer 244 for equalization. The de-mapping unit 246, coupled to the one-tap equalizer 244, de-maps signals from the one-tap equalizer 244 to obtain the estimation of de-mapped signal d(k).

Figure 4:
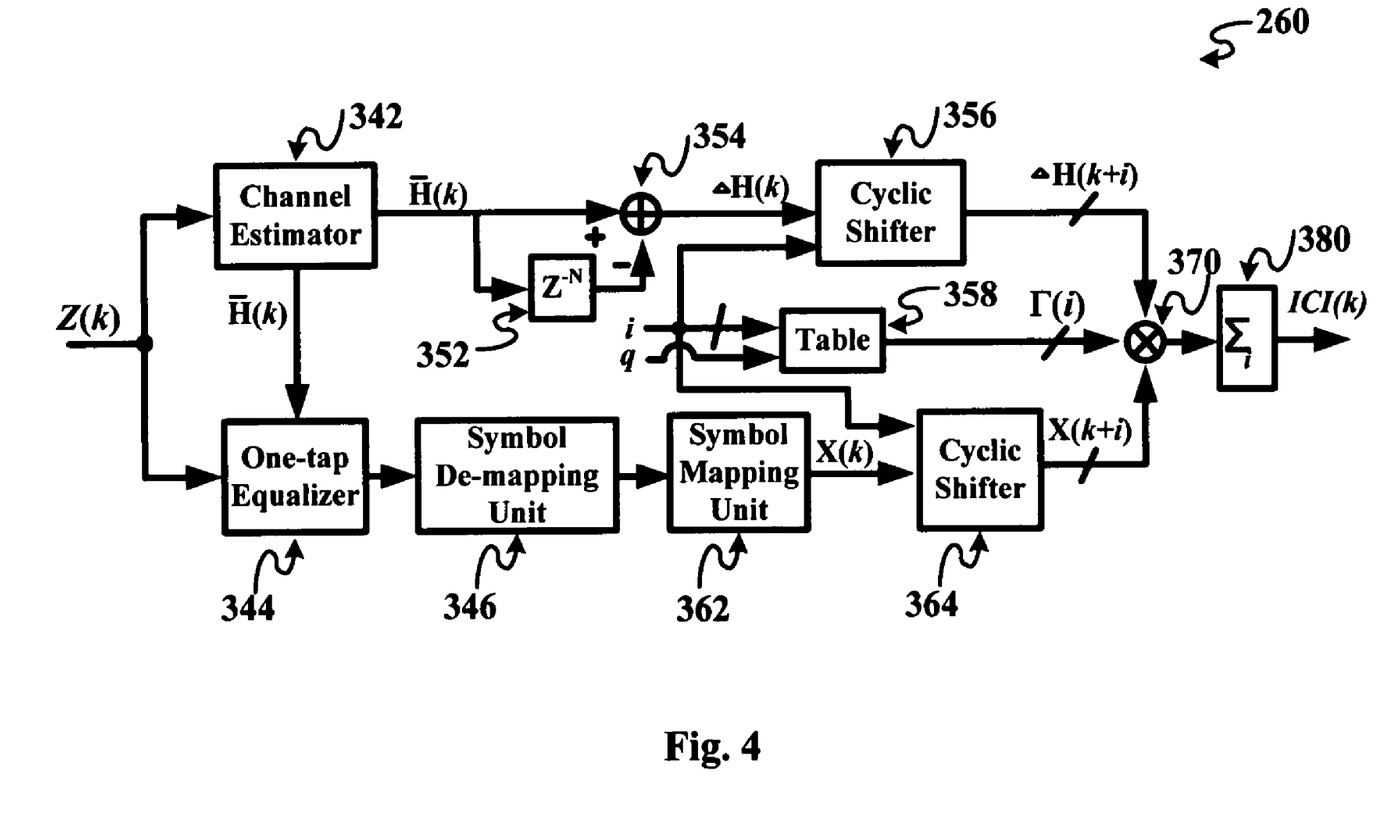
FIG. 4 is a block diagram of an ICI reconstruction module illustrated in FIG. 2 and FIG. 3.

FIG. 4 is a block diagram of the ICI reconstruction module 260 illustrated in FIG. 2 and FIG. 3. Referring to FIG. 4, a channel estimator 342 is capable of providing an averaged channel response $\bar{H}(k)$ in response to the signals Z(k). A delay unit 352 is capable of delaying the averaged channel response $\bar{H}(k)$ to provide a delayed averaged channel response. A subtracting unit 354 subtracts the delayed averaged channel response from the averaged channel response to provide a channel variation term $\Delta H(k)$ between two adjacent symbols. A cyclic shifter 356, coupled to the subtracting unit 354, is capable of cyclically shifting the channel variation term $\Delta H(k)$ to provide a cyclic shifted channel variation term $\Delta H(k+i)$. A one-tap equalizer 344, coupled to the channel estimator 342, is capable of equalizing the signal Z(k) to provide an equalized signal. A symbol de-mapping unit 346, coupled to the one-tap equalizer 344, is capable of de-mapping the equalized signal to provide a de-mapped signal. A symbol mapping unit 362, coupled to the symbol de-mapping unit 346, is capable of providing a mapped symbol X(k) in response to the de-mapped signal. Another cyclic shifter 364, coupled to the symbol mapping unit 362, is capable of cyclically shifting the mapped symbol X(k) to provide a cyclic shifted mapped symbol X(k+i).

Based on the information of the length q of the ISI-free region, an embedded look-up table 358 may provide an attenuation coefficient $\Gamma(i)$ due to signals received from a surrounding i-th sub-carrier. Furthermore, a multiplier 370 is capable of multiplying the cyclic shifted channel variation term $\Delta H(k+i)$ and the cyclic shifted mapped symbol X(k+i) with the ICI attenuation coefficient $\Gamma(i)$ to provide an ICI term. Next, a summing unit 380 sums the ICI terms provided by the multiplier 370 to provide an estimated ICI ICI(k).

In one example, the ICI attenuation coefficient $\Gamma(i)$ is 0 (zero) at particular values of i, which decreases the complexity of the ICI reconstruction module 260. As an example, given q=N/4, $\Gamma(i)$ becomes 0 when i equals ±2, ±6, ±10 or (±2±4S), S being an integer. As another example, given q=N/8, $\Gamma(i)$ becomes 0 when i equals ±4, ±8 or (±4±4T), T being an integer.

Figure 5:
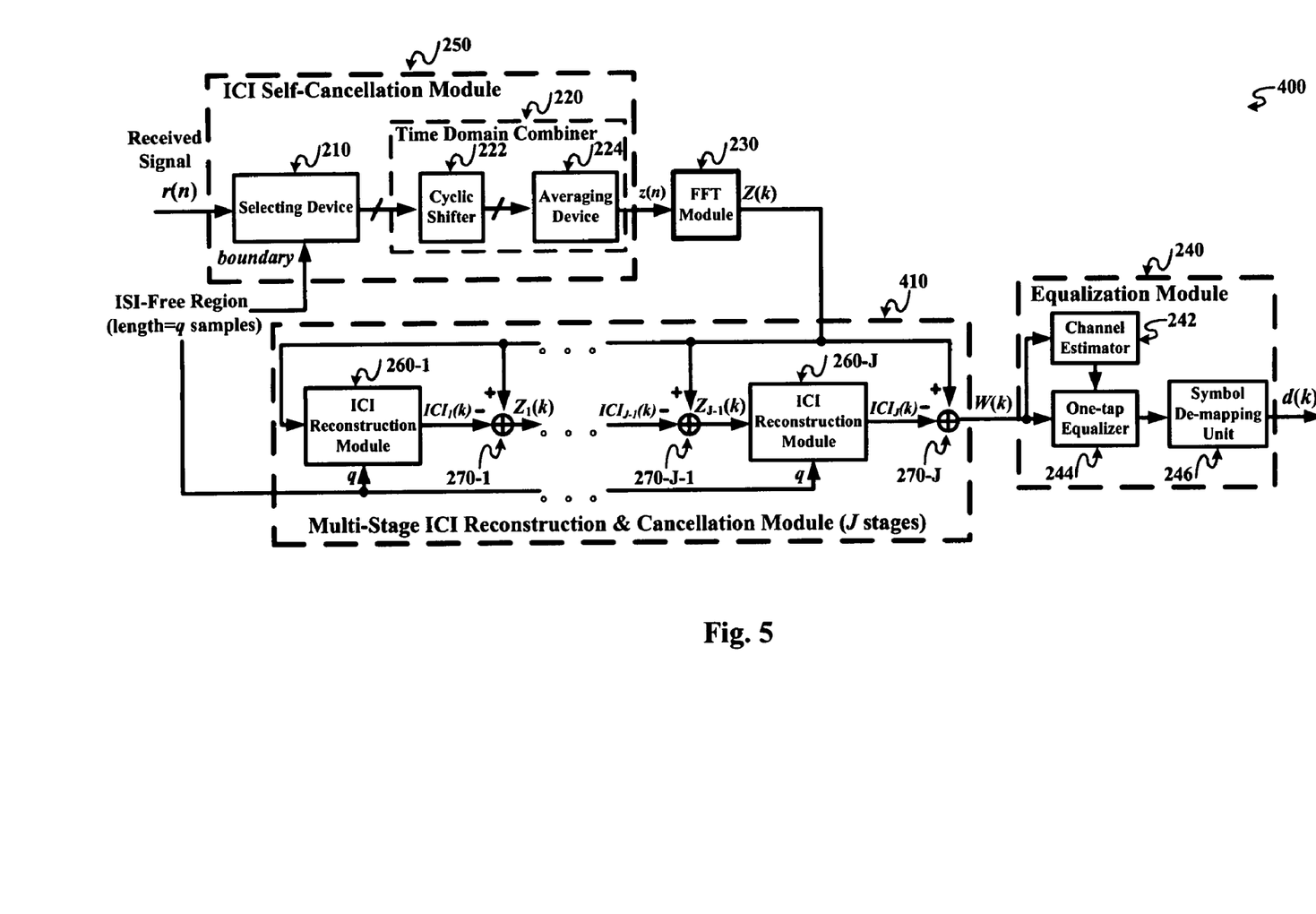
FIG. 5 is a block diagram of an apparatus for ICI self-cancellation and ICI reconstruction and cancellation according to an example of the present invention.

The present apparatus for ICI reconstruction and cancellation may adopt multiple stages ICI reconstruction and cancellation for further reducing ICI effect by employing a plurality of ICI reconstruction and cancellation modules. FIG. 5 is a block diagram of an apparatus 400 for ICI self-cancellation and ICI reconstruction and cancellation according to an example of the present invention. Referring to FIG. 5, the apparatus 400 for ICI self-cancellation and ICI reconstruction and cancellation is similar to the apparatus 200 for ICI self-cancellation and ICI reconstruction and cancellation illustrated in FIG. 2 except a series of ICI reconstruction modules 260-1 to 260-J and a series of subtracting units 270-1 to 2701-J coupled between the FFT module 230 and the equalization module 240. The output signals Z(k) of the FFT module 230 is sent to a first ICI reconstruction module 260-1 for performing a first-stage ICI reconstruction. The output signal $ICI_1(k)$ of the first ICI reconstruction module 260-1 is subtracted from the output signals Z(k) of the FFT module 230 by the subtracting unit 270-1 to provide a first signal $Z_1(k)$. The first signal $Z_1(k)$ is then sent to a second ICI reconstruction module 260-2 for a second-stage ICI reconstruction, and so on. The apparatus 400 for ICI self-cancellation and ICI reconstruction and cancellation may include J stages of ICI reconstruction, J being an integer. After J stages of ICI reconstruction and cancellation, a J-th signal $Z_J(k)$ is sent to the channel estimator 242 and the one-tap equalizer 244 in the equalization module 240.

Figure 6:
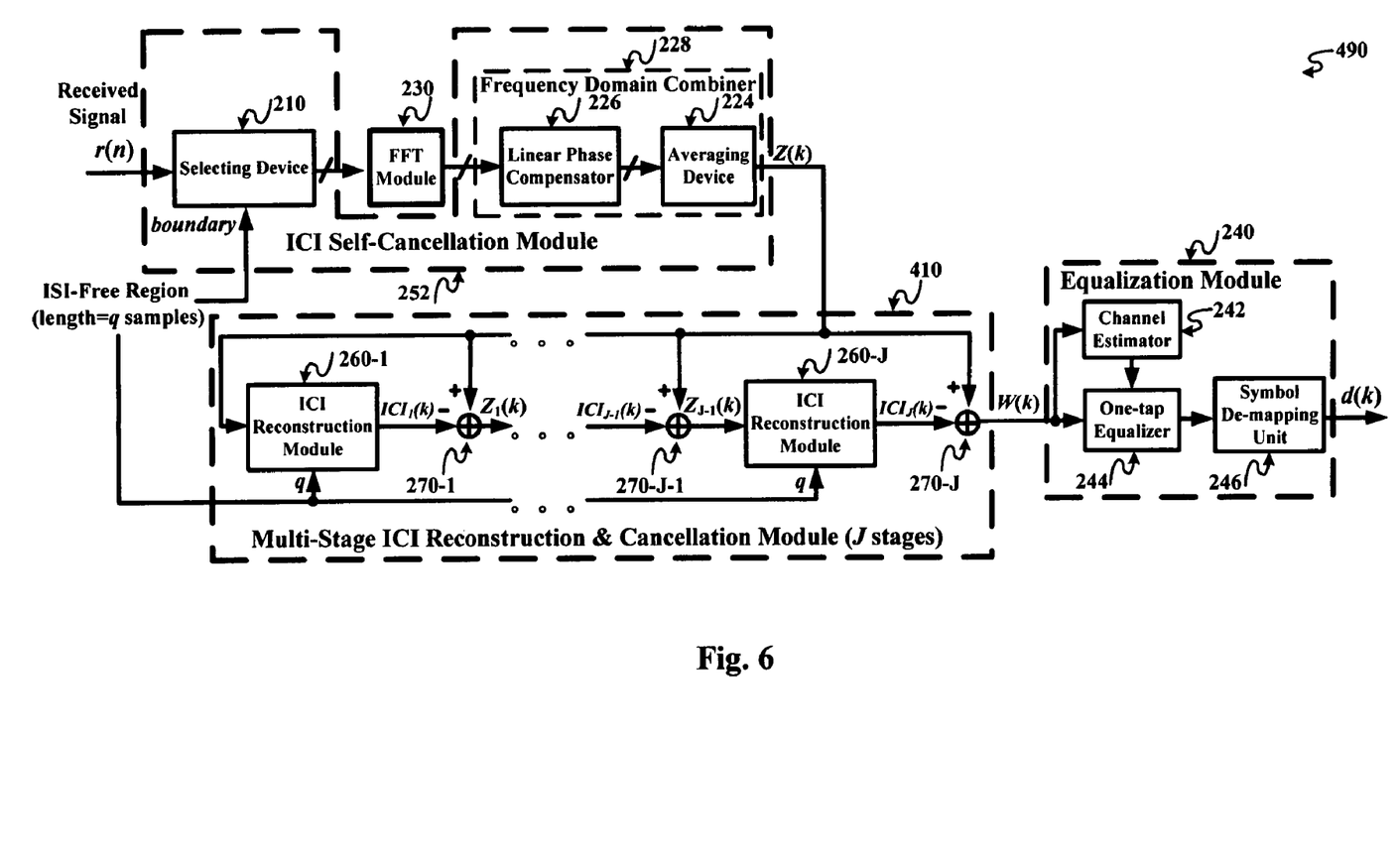
FIG. 6 is a block diagram of an apparatus for ICI self-cancellation and ICI reconstruction and cancellation according to an example of the present invention.

FIG. 6 is a block diagram of an apparatus 490 for ICI self-cancellation and ICI reconstruction and cancellation according to an example of the present invention. The apparatus 490 for ICI self-cancellation and ICI reconstruction and cancellation is similar to the apparatus 290 for ICI self-cancellation and ICI reconstruction and cancellation illustrated in FIG. 3 except a series of ICI reconstruction modules 260-1 to 260-J and a series of subtracting units 270-1 to 270-J coupled between the frequency domain combiner 228 and the equalization module 240. The output signals Z(k) of the frequency domain combiner 228 are sent to a first ICI reconstruction module 260-1 for performing a first-stage ICI reconstruction. The output signal $ICI_1(k)$ of the first ICI reconstruction module 260-1 is subtracted from the output signals Z(k) of the frequency domain combiner 228 by the subtracting unit 270-1 to provide a first signal $Z_1(k)$. The first signal $Z_1(k)$ is then sent to a second ICI reconstruction module 260-2 for a second-stage ICI reconstruction, and so on. The apparatus 490 for ICI self-cancellation and ICI reconstruction and cancellation may include J stages of ICI reconstruction, J being an integer. After J stages of ICI reconstruction and cancellation, a J-th signal W(k) is sent to the channel estimator 242 and the one-tap equalizer 244 in the equalization module 240.

The method and apparatus for ICI self-cancellation and ICI reconstruction and cancellation of the present invention utilize the information of the length of ISI-free region of the OFDM signals for performing the ICI cancellation. The structure of the FFT module may be simplified, and the loading of operation may be reduced.

In describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. An inter-carrier interference (ICI) reconstruction device for providing an estimated ICI, the ICI reconstruction and cancellation device comprising:
    a channel estimator configured to provide an averaged channel response during one OFDM symbol for received signals Z(k);
    a delay unit configured to delay the averaged channel response to provide a delayed averaged channel response;
    a subtracting unit configured to subtract the delayed averaged channel response from the averaged channel response to provide a channel variation term during one OFDM symbol;
    a first cyclic shifter configured to cyclically shift the channel variation term to provide a cyclic shifted channel variation term;
    a one-tap equalizer configured to equalize the received signals Z(k) to provide an equalized signal;
    a symbol de-mapping unit configured to de-map the equalized signal to provide a de-mapped signal;
    a symbol mapping unit configured to provide a mapped symbol based on the de-mapped signal;
    a second cyclic shifter configured to cyclically shift the mapped symbol to provide a cyclic shifted mapped symbol;
    a multiplier configured to provide an ICI term including being configured to multiply the cyclic shifted channel variation term and the cyclic shifted mapped symbol with an ICI attenuation coefficient due to signals received from a surrounding i-th sub-carrier, i being an integer, wherein the ICI attenuation coefficient is related with a length of inter-symbol interference-free (ISI-free) region; and
    a summing unit configured to sum ICI terms provided by the multiplier to provide an estimated ICI ICI(k), wherein each of the ICI terms corresponds to a different value of i.

2. The ICI reconstruction and cancellation device of claim 1, wherein at least of the ICI attenuation coefficients is 0.

3. A device for inter-carrier interference (ICI) self-cancellation and ICI reconstruction and cancellation, the device comprising:
    a selecting device configured to select a plurality of inter-symbol interference (ISI)-free signals from input signals r(n) and receive boundary information regarding a length of an ISI-free region from the input signals r(n);
    a combiner configured to combine the plurality of ISI-free signals to provide combined signals z(n);
    a Fast-Fourier Transform (FFT) module configured to perform FFT operations on the combined signals to provide output signals Z(k);
    an ICI reconstruction module comprising:
        a channel estimator configured to provide average channel response during one OFDM symbol for the output signals Z(k);
        a delay unit configured to delay the averaged channel response to provide a delayed averaged channel response;
        a first subtracting unit configured to subtract the delayed averaged channel response from the averaged channel response to provide a channel variation term during one OFDM symbol;
        a first cyclic shifter configured to cyclically shift the channel variation term to provide a cyclic shifted channel variation term;
        a one-tap equalizer configured to equalize the output signals Z(k) to provide an equalized signal;
        a symbol de-mapping unit configured to de-map the equalized signal to provide a de-mapped signal;
        a symbol mapping unit configured to provide a mapped symbol based on the de-mapped signal;
        a second cyclic shifter configured to cyclically shift the mapped symbol to provide a cyclic shifted mapped symbol;
        a multiplier configured to provide an ICI term including being configured to multiply the cyclic shifted channel variation term and the cyclic shifted mapped symbol with an ICI attenuation coefficient due to signals received from a surrounding i-th sub-carrier, i being an integer, wherein the ICI attenuation coefficient is related to the length of the ISI-free region of the input signals r(n); and
        a summing unit capable of summing configured to sum ICI terms provided by the multiplier to provide an estimated ICI, wherein each of the ICI terms corresponds to a different value of i;
    a second subtracting unit configured to provide a cancelled signal W(k) including being configured to subtract the estimated ICI from the output signals Z(k) provided by the FFT module; and
    an equalization module.

4. The device of claim 3, wherein the combiner further comprises:
    a cyclic shifter configured to cyclically shift a plurality of ISI-free signals to provide a plurality of cyclic shifted ISI-free signals; and
    an averaging unit configured to average the cyclic shifted ISI-free signals to provide the combined signals z(n).

5. The device of claim 3, wherein the equalization module further comprises:
    a channel estimator configured to estimate the averaged channel response during one OFDM symbol for the cancelled signal W(k);
    an one-tap equalizer configured to equalize the cancelled signal W(k) to provide an equalized signal; and
    a de-mapping unit configured to de-map the equalized signal to provide a de-mapped signal d(k).

6. The device of claim 3, wherein the selecting device is configured to select at least two ISI-free signals from the input signals r(n).

7. The device of claim 3, wherein the FFT module includes an N-point FFT module.

8. A method for inter-carrier interference (ICI) self-cancellation and ICI reconstruction and cancellation, comprising:
receiving input signals r(n);
receiving boundary information regarding a length q of an inter-symbol interference (ISI)-free region of the input signals r(n);
selecting a plurality of ISI-free signals from the input signals r(n);
combining the plurality of ISI-free signals to provide combined signals z(n);
performing FFT operations on the combined signals z(n) to provide output signals Z(k);
reconstructing ICI based on the output signals Z(k) and a length q of an ISI-free region of the input signals r(n) in order to provide an estimated ICI ICI(k);
subtracting the estimated ICI from the output signals Z(k) to provide a cancelled signal W(k);
performing channel estimation for the cancelled signal W(k);
equalizing the cancelled signal W(k) to provide an equalized signal; and
de-mapping the equalized signal to provide a de-mapped signal d(k).

9. The method of claim 8, wherein combining the plurality of ISI-free signals to provide combined signals further comprises:
cyclically shifting the plurality of ISI-free signals to provide the plurality of cyclic shifted ISI-free signals; and
averaging the cyclic shifted ISI-free signals to provide the combined signals z(n).

10. The method of claim 8, wherein reconstructing ICI further comprises:
performing a channel estimation based on the output signals Z(k) to provide an averaged channel response during one OFDM symbol for the output signals Z(k);
delaying the averaged channel response to provide a delayed averaged channel response;
subtracting the delayed averaged channel response from the averaged channel response to provide a channel variation term during one OFDM symbol;
cyclically shifting the channel variation term to provide a cyclic shifted channel variation term;
performing a one-tap equalization for the output signals Z(k) to provide an equalized signal;
de-mapping the equalized signal to provide a de-mapped signal;
mapping the de-mapped signal to provide a mapped symbol for the de-mapped signal;
cyclically shifting the mapped symbol to provide a cyclic shifted mapped symbol;
multiplying the cyclic shifted channel variation term and the cyclic shifted mapped symbol with an ICI attenuation coefficient due to signals received from a surrounding i-th sub-carrier, i being an integer, wherein the ICI attenuation coefficient is related to the length of the ISI-free region of the input signals r(n); and
summing ICI terms provided by the multiplier to provide the estimated ICI, wherein each of the ICI terms corresponds to a different value of i.

11. The method of claim 8, wherein selecting a plurality ISI-free signals from the input signals r(n) further comprises selecting at least two ISI-free signals from the input signals r(n).

12. The method of claim 8, wherein performing FFT operations on the combined signals z(n) to provide output signals Z(k) further comprises performing N-point FFT operations on the combined signals z(n) to provide output signals Z(k).

13. A device for inter-carrier interference (ICI) self-cancellation and ICI reconstruction and cancellation, the device comprising:
a selecting device configured to select a plurality of inter-symbol interference (ISI)-free signals from input signals r(n) and receive boundary information regarding a length q of an ISI-free region from the input signals r(n);
a Fast-Fourier Transform (FFT) module configured to perform FFT operations on the plurality of ISI-free signals to provide output signals;
a combiner configured to combine the output signals from the FFT module to provide combined signals Z(k);
an ICI reconstruction and cancellation module comprising:
a channel estimator capable of providing configured to provide an averaged channel response during one OFDM symbol for the combined signals Z(k);
a delay unit configured to delay the averaged channel response to provide a delayed averaged channel response;
a first subtracting unit configured to subtract the delayed averaged channel response from the averaged channel response to provide a channel variation term;
a first cyclic shifter configured to cyclically shift the channel variation term to provide a cyclic shifted channel variation term during one OFDM symbol;
a one-tap equalizer configured to equalize the combined signals Z(k) to provide an equalized signal;
a symbol de-mapping unit configured to de-map the equalized signal to provide a de-mapped signal;
a symbol mapping unit configured to provide a mapped symbol based on the de-mapped signal;
a second cyclic shifter configured to cyclically shift the mapped symbol to provide a cyclic shifted mapped symbol;
a multiplier configured to provide an ICI term including being configured to multiply the cyclic shifted channel variation term and the cyclic shifted mapped symbol with an ICI attenuation coefficient due to signals received from a surrounding i-th sub-carrier, i being an integer, wherein the ICI attenuation coefficient is related to the length of the ISI-free region of the input signals r(n); and
a summing unit configured to sum ICI terms provided by the multiplier to provide an estimated ICI, wherein each of the ICI terms corresponds to a different value of i;
a second subtracting unit configured to provide a cancelled signal W(k) including being configured to subtract the estimated ICI from the combined signals Z(k); and
an equalization module.

14. The device of claim 13, wherein the combiner further comprises:
a linear phase compensator configured to compensate the corresponding linear phases of a plurality of ISI-free signals from the output of FFT module to provide a plurality of compensated ISI-free signals; and
an averaging unit configured to average the compensated ISI-free signals to provide the combined signals Z(k).

15. The device of claim 13, wherein the equalization module further comprises:
a channel estimator configured to estimate the averaged channel response during one OFDM symbol for the cancelled signal W(k);
an one-tap equalizer configured to equalize the cancelled signal W(k) to provide an equalized signal; and
a de-mapping unit configured to de-map the equalized signal to provide a de-mapped signal d(k).

16. The device of claim 13, wherein the selecting device is configured to select at least two ISI-free signals from the input signals r(n).

17. A device for inter-carrier interference (ICI) self-cancellation and ICI reconstruction and cancellation, the device comprising:

a selecting device configured to select a plurality of inter-symbol interference (ISI)-free signals from input signals r(n) and receive boundary information regarding a length q of an ISI-free region from the input signals r(n);

a time domain combiner configured to combine the plurality of ISI-free signals to provide combined signals z(n);

a Fast-Fourier Transform (FFT) module configured to perform FFT operations on the combined signals z(n) to provide output signals Z(k);

a multi-stage ICI reconstruction and cancellation module including J stages of ICI reconstruction and cancellation modules, wherein an ICI reconstruction and cancellation module of a last stage comprises:

a first channel estimator configured to provide an averaged channel response during one OFDM symbol for output signals $Z_{j-1}(k)$ from an ICI reconstruction and cancellation module of a previous stage;

a delay unit configured to delay the averaged channel response to provide a delayed averaged channel response;

a first subtracting unit configured to subtract the delayed averaged channel response from the averaged channel response to provide a channel variation term during one OFDM symbol;

a first cyclic shifter configured to cyclically shift the channel variation term to provide a cyclic shifted channel variation term;

a first one-tap equalizer configured to equalize the output signals $Z_{J-1}(k)$ to provide an equalized signal;

a first symbol de-mapping unit configured to de-map the equalized signal to provide a de-mapped signal;

a symbol mapping unit configured to provide a mapped symbol based on the de-mapped signal;

a second cyclic shifter configured to cyclically shift the mapped symbol to provide a cyclic shifted mapped symbol;

a multiplier configured to provide an ICI term including being configured to multiply the cyclic shifted channel variation term and the cyclic shifted mapped symbol with an ICI attenuation coefficient due to signals received from a surrounding i-th sub-carrier, i being an integer, wherein the ICI attenuation coefficient is related to the length of the ISI-free region of the input signals r(n);

a summing unit configured to sum ICI terms provided by the multiplier to provide an estimated ICI $ICI_J(k)$, wherein each of the ICI terms corresponds to a different value of i; and a second subtracting unit configured to subtract the estimated ICI $ICI_J(k)$ from the output signals Z(k) to provide a cancelled signal W(k); and an equalization module further comprising:

a second channel estimator configured to provide an average channel response during one OFDM symbol for the cancelled signal W(k);

a second one-tap equalizer configured to equalize the cancelled signal W(k) to provide an equalized signal; and a second symbol de-mapping unit configured to de-map the equalized signal to provide a de-mapped signal d(k).

18. A device for inter-carrier interference (ICI) self-cancellation and reconstruction and cancellation, the device comprising:

a selecting device configured to select a plurality of inter-symbol interference (ISI)-free signals from input signals r(n) and receive boundary information of a length q of an ISI-free region from the input signals r(n);

a Fast-Fourier Transform (FFT) module configured to perform FFT operations on the plurality of ISI-free signals to provide output signals;

a combiner configured to combine the output signals from the FFT module to provide combined signals Z(k);

a multi-stage ICI reconstruction and cancellation module including J stages of ICI reconstruction and cancellation modules, wherein an ICI reconstruction and cancellation module of a last stage comprises:

a first channel estimator capable of providing configured to provide an averaged channel response during one OFDM symbol for output signals $Z_{J-1}(k)$ from a previous stage of ICI reconstruction and cancellation module;

a delay unit configured to delay the averaged channel response to provide a delayed averaged channel response;

a first subtracting unit configured to subtract the delayed averaged channel response from the averaged channel response to provide a channel variation term during one OFDM symbol;

a first cyclic shifter to cyclically shift the channel variation term to provide a cyclic shifted channel variation term;

a first one-tap equalizer configured to equalize the output signals $Z_{J-1}(k)$ to provide an equalized signal;

a first symbol de-mapping unit configured to de-map the equalized signal to provide a de-mapped signal;

a symbol mapping unit configured to provide a mapped symbol based on the de-mapped signal;

a second cyclic shifter configured to cyclically shift the mapped symbol to provide a cyclic shifted mapped symbol;

a multiplier configured to provide an ICI term including being configured to multiply the cyclic shifted channel variation term and the cyclic shifted mapped symbol with an ICI attenuation coefficient due to signals received from a surrounding i-th sub-carrier, i being an integer, wherein the ICI attenuation coefficient is related to the length of the ISI-free region of the input signals r(n); and a summing unit configured to sum ICI terms provided by the multiplier to provide an estimated ICI $ICI_J(k)$, wherein each of the ICI terms corresponds to a different value of i;

a second subtracting unit configured to subtract the estimated ICI $ICI_J(k)$ from the combined signals Z(k) to provide a cancelled signal W(k);

an equalization module further comprising:

a second channel estimator configured to provide an average channel response during one OFDM symbol for the cancelled signal W(k);

a second one-tap equalizer configured to equalize the cancelled signal W(k) to provide an equalized signal;

a second symbol de-mapping unit configured to de-map the equalized signal to provide a de-mapped signal d(k).

19. A device for inter-carrier interference (ICI) self-cancellation and ICI reconstruction and cancellation, comprising:
a selecting circuit configured to receive a length q of an inter-symbol interference (ISI)-free region from input signals r(n) and select a plurality of inter-symbol interference (ISI)-free signals having a length of N sample points, q and N each being an integer;
a combination circuit configured to process the ISI-free signals in time domain for ICI self-cancellation; and
a reconstruction circuit configured to reconstruct ICI terms in frequency domain for ICI reconstruction and cancellation,
wherein the length q is selected to simplify the ICI terms.

20. The device of claim 19, wherein the length q is not greater than N/2.

21. The device of claim 19, wherein the length q equals N/4.

22. The device of claim 19, wherein the length q equals N/8.

* * * * *

UNITED STATES PATENT AND TRADEMARK OFFICE
CERTIFICATE OF CORRECTION

Page 1 of 1

PATENT NO. : 7,720,183 B2
APPLICATION NO. : 11/646771
DATED : May 18, 2010
INVENTOR(S) : Tseng et al.

It is certified that error appears in the above-identified patent and that said Letters Patent is hereby corrected as shown below:

Column 10,

Line 7, "provide average" should read --provide an average--;

Line 37, cancel "capable of summing".

Column 12,

Line 14, cancel "capable of providing";

Line 28, "dc-map" should read --de-map--.

Column 14,

Line 19, cancel "capable of providing";

Line 32, "shifter to" should read --shifter configured to--.

Signed and Sealed this
Eighth Day of March, 2011

David J. Kappos
*Director of the United States Patent and Trademark Office*